United States Patent
Chung et al.

(10) Patent No.: US 10,853,247 B2
(45) Date of Patent: Dec. 1, 2020

(54) DEVICE FOR MAINTAINING DATA CONSISTENCY BETWEEN HARDWARE ACCELERATOR AND HOST SYSTEM AND METHOD THEREOF

(71) Applicant: INDUSTRY-ACADEMIC COOPERATION FOUNDATION, YONSEI UNIVERSITY, Seoul (KR)

(72) Inventors: Eui Young Chung, Seoul (KR); Hyeok Jun Seo, Seoul (KR); Sang Woo Han, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 27 days.

(21) Appl. No.: 15/461,820

(22) Filed: Mar. 17, 2017

(65) Prior Publication Data

US 2017/0270043 A1 Sep. 21, 2017

(30) Foreign Application Priority Data

Mar. 18, 2016 (KR) ........................ 10-2016-0033036

(51) Int. Cl.
*G06F 12/0804* (2016.01)
*G06F 12/0815* (2016.01)
(Continued)

(52) U.S. Cl.
CPC ...... *G06F 12/0804* (2013.01); *G06F 12/0815* (2013.01); *G06F 12/0891* (2013.01); *G06F 2212/1008* (2013.01)

(58) Field of Classification Search
CPC ............. G06F 12/0804; G06F 12/0815; G06F 12/0891; G06F 2212/1008
See application file for complete search history.

(56) References Cited

U.S. PATENT DOCUMENTS 5,045,998 A * 9/1991 Begun ................. G06F 12/0888
710/307
5,327,545 A * 7/1994 Begun ................. G06F 12/0888
711/133

(Continued)

FOREIGN PATENT DOCUMENTS

| CN | 102420982 A | 4/2012 |
| KR | 10-1999-0072593 A | 9/1999 |
| KR | 10-2004-0038340 A | 5/2004 |

OTHER PUBLICATIONS

Webopedia, "Understanding Video and Graphics Adapters", Jul. 8, 2005, pp. 1-6, https://www.webopedia.com/DidYouKnow/Hardware_Software/video_card.asp (Year: 2005).*

(Continued)

*Primary Examiner* — Christopher D Birkhimer
(74) *Attorney, Agent, or Firm* — Sughrue Mion, PLLC (57) ABSTRACT

Disclosed is a device for maintaining consistency between a host system cache and a main memory in a general-purpose computing system equipped with a hardware accelerator for processing main memory data. The device for maintaining data consistency between a hardware accelerator and a host system, which is at least temporarily implemented by a computer, includes a determination unit responsible for determining whether an address which the hardware accelerator should access is present in a cache, and a processing unit responsible for selectively performing write-back on data corresponding to the address when the address is present in the cache based on the determined result.

3 Claims, 9 Drawing Sheets

(51) Int. Cl.
*G06F 12/0868* (2016.01)
*G06F 12/0891* (2016.01)

(56) References Cited

U.S. PATENT DOCUMENTS

| | | | | |
|---|---|---|---|---|
| 5,687,350 A * | 11/1997 | Bucher | G06F 12/0859 | 711/140 |
| 5,933,618 A * | 8/1999 | Tran | G06F 9/30152 | 712/212 |
| 6,720,969 B2 | 4/2004 | Lavelle | G06F 12/0897 | 345/557 |
| 6,778,179 B2 | 8/2004 | Lavelle | G06F 12/0897 | 345/557 |
| 6,795,078 B2 | 9/2004 | Lavelle | G06F 12/0891 | 345/535 |
| 7,027,064 B2 | 4/2006 | Lavelle | G06T 1/60 | 345/537 |
| 7,366,882 B2 | 4/2008 | Sahraoui | G06F 9/3555 | 711/213 |
| 7,389,403 B1 | 6/2008 | Alpert | G06F 9/3851 | 712/10 |
| 7,624,236 B2 * | 11/2009 | Chrysos | G06F 12/0804 | 711/141 |
| 7,779,238 B2 * | 8/2010 | Kosche | G06F 11/3447 | 712/227 |
| 7,809,889 B2 * | 10/2010 | Nychka | G06F 12/0811 | 711/119 |
| 8,001,538 B2 * | 8/2011 | Gray | G06F 9/30047 | 711/145 |
| 8,214,598 B2 * | 7/2012 | Dixon | G06F 12/0891 | 711/135 |
| 8,225,297 B2 * | 7/2012 | Gray | G06F 12/084 | 711/145 |
| 8,327,187 B1 * | 12/2012 | Metcalf | G06F 9/4881 | 714/10 |
| 8,392,661 B1 * | 3/2013 | Metcalf | G06F 12/1027 | 711/133 |
| 8,423,721 B2 * | 4/2013 | Moyer | G06F 12/0804 | 711/141 |
| 8,478,799 B2 * | 7/2013 | Beaverson | G06F 17/30097 | 707/823 |
| 8,489,820 B1 * | 7/2013 | Ellard | G06F 12/0246 | 711/120 |
| 8,521,963 B1 * | 8/2013 | Miao | G06F 12/1027 | 711/141 |
| 8,539,155 B1 * | 9/2013 | Miao | G06F 12/1027 | 711/121 |
| 8,549,249 B1 * | 10/2013 | Metcalf | G06F 12/1027 | 711/166 |
| 8,572,329 B2 * | 10/2013 | Axford | G06F 12/1491 | 711/150 |
| 8,572,353 B1 * | 10/2013 | Bratt | G06F 12/1027 | 712/16 |
| 8,612,711 B1 * | 12/2013 | Griffin | G06F 12/1027 | 711/165 |
| 8,738,926 B2 * | 5/2014 | Delfs | G06F 21/74 | 713/172 |
| 8,762,652 B2 * | 6/2014 | Moyer | G06F 12/0831 | 711/135 |
| 8,799,624 B1 * | 8/2014 | Griffin | G06F 12/1027 | 712/29 |
| 8,799,914 B1 * | 8/2014 | Metcalf | G06F 12/1027 | 718/104 |
| 8,813,052 B2 * | 8/2014 | Gray | G06F 9/3004 | 717/149 |
| 8,868,847 B2 * | 10/2014 | Gonion | G06F 12/0831 | 711/146 |
| 8,886,899 B1 * | 11/2014 | Bao | G06F 12/1027 | 711/158 |
| 8,898,652 B2 * | 11/2014 | Gray | G06F 9/30003 | 717/149 |
| 8,913,616 B2 * | 12/2014 | Lee | G06F 13/4273 | 370/392 |
| 8,934,347 B1 * | 1/2015 | Bratt | G06F 12/1027 | 370/237 |
| 8,937,622 B2 * | 1/2015 | Bourd | G06F 9/546 | 345/541 |
| 9,037,800 B2 * | 5/2015 | Ellard | G06F 12/0246 | 711/118 |
| 9,063,825 B1 * | 6/2015 | Bao | G06F 12/1027 | |
| 9,135,215 B1 * | 9/2015 | Bratt | G06F 12/1027 | |
| 9,164,910 B2 * | 10/2015 | Chaussade | G06F 12/0835 | |
| 9,213,652 B1 * | 12/2015 | Miao | G06F 12/1027 | |
| 9,223,710 B2 * | 12/2015 | Alameldeen | G06F 12/0864 | |
| 9,244,851 B2 * | 1/2016 | Ambroladze | G06F 12/0815 | |
| 9,274,960 B2 * | 3/2016 | Kaxiras | G06F 12/0815 | |
| 2002/0171655 A1 * | 11/2002 | Lavelle | G06F 12/0897 | 345/557 |
| 2002/0171657 A1 * | 11/2002 | Lavelle | G06F 12/0897 | 345/557 |
| 2003/0097531 A1 * | 5/2003 | Arimilli | G06F 12/0831 | 711/146 |
| 2003/0142101 A1 * | 7/2003 | Lavelle | G06F 12/0891 | 345/537 |
| 2003/0160796 A1 * | 8/2003 | Lavelle | G06T 1/60 | 345/557 |
| 2004/0039880 A1 * | 2/2004 | Pentkovski | G06F 12/0811 | 711/146 |
| 2006/0143406 A1 * | 6/2006 | Chrysos | G06F 12/0804 | 711/143 |
| 2007/0043531 A1 * | 2/2007 | Kosche | G06F 11/3447 | 702/182 |
| 2007/0294494 A1 * | 12/2007 | Conti | G06F 12/123 | 711/158 |
| 2008/0040551 A1 * | 2/2008 | Gray | G06F 12/084 | 711/130 |
| 2009/0024796 A1 * | 1/2009 | Nychka | G06F 12/0811 | 711/122 |
| 2009/0106501 A1 * | 4/2009 | Wang | G06F 12/0891 | 711/143 |
| 2009/0150620 A1 | 6/2009 | Paver et al. | | |
| 2009/0177843 A1 * | 7/2009 | Wallach | G06F 12/0844 | 711/131 |
| 2009/0183009 A1 * | 7/2009 | Delfs | G06F 21/74 | 713/193 |
| 2009/0276579 A1 * | 11/2009 | Moyer | G06F 12/0804 | 711/141 |
| 2011/0153952 A1 * | 6/2011 | Dixon | G06F 12/0891 | 711/135 |
| 2011/0320558 A1 * | 12/2011 | Gross | G06F 12/0813 | 709/213 |
| 2012/0005431 A1 * | 1/2012 | Gross | G06F 12/0813 | 711/130 |
| 2012/0069029 A1 * | 3/2012 | Bourd | G06F 9/546 | 345/502 |
| 2012/0069035 A1 * | 3/2012 | Bourd | G06F 9/546 | 345/541 |
| 2013/0028261 A1 * | 1/2013 | Lee | G06F 15/7825 | 370/392 |
| 2013/0254488 A1 * | 9/2013 | Kaxiras | G06F 12/0815 | 711/130 |
| 2013/0290263 A1 * | 10/2013 | Beaverson | G06F 17/30097 | 707/649 |
| 2014/0047062 A1 * | 2/2014 | Krueger | H04L 67/2842 | 709/216 |
| 2014/0047181 A1 * | 2/2014 | Peterson | G06F 12/0873 | 711/118 |
| 2014/0047183 A1 * | 2/2014 | Chawla | G06F 12/084 | 711/119 |
| 2014/0047185 A1 * | 2/2014 | Peterson | H04L 5/0032 | 711/123 |
| 2014/0047190 A1 * | 2/2014 | Dawkins | G06F 12/0813 | 711/136 |
| 2014/0047193 A1 * | 2/2014 | Gross | G06F 12/0893 | 711/144 |
| 2014/0258379 A1 * | 9/2014 | L'Heureux | H04L 67/10 | 709/203 |
| 2014/0304475 A1 * | 10/2014 | Ramanujan | G06F 12/0895 | 711/128 |

(56) References Cited

U.S. PATENT DOCUMENTS

| | | | |
|---|---|---|---|
| 2015/0032971 A1* | 1/2015 | Tian | G06F 12/0842 711/141 |
| 2015/0097849 A1* | 4/2015 | Bourd | G06F 9/546 345/541 |
| 2015/0178211 A1* | 6/2015 | Hiramoto | G06F 12/0806 711/143 |
| 2015/0186279 A1* | 7/2015 | Dong | G06F 12/0833 711/135 |
| 2015/0378905 A1* | 12/2015 | Bradbury | G06F 12/0815 711/130 |
| 2016/0048451 A1* | 2/2016 | Solihin | G06F 12/0833 711/105 |

OTHER PUBLICATIONS

Cory Janssen, "Hardware Acceleration", Jul. 3, 2014, pp. 1-1, https://web.archive.org/web/20140703093805/https://www.techopedia.com/definition/15178/hardware-acceleration (Year: 2014).*

Filipa Duarte, "Cache-Based Memory Copy Hardware Accelerator for Multicore Systems", IEEE Transactions on Computers, vol. 59, No. 11, Nov. 2010, pp. 1-14, https://ieeexplore.ieee.org/stamp/stamp.jsp?tp=&arnurnber=5416684 (Year: 2010).*

Webopedia, "API—application program interface", Feb. 1, 2014, pp. 1-2, https://web.archive.org/web/20140201170853/https://www.webopedia.com/TERM/A/API.html (Year: 2014).*

Gene Cooperman, "Cache Basics", 2003, pp. 1-3, https://course.ccs.neu.edu/com3200/parent/NOTES/cache-basics.html (Year: 2003).*

Sat Garcia, "The Basics of Caches", Apr. 18, 2013, pp. 1-3, https://web.archive.org/web/20130418145943/https://cseweb.ucsd.edu/classes/su07/cse141/cache-handout.pdf (Year: 2013).*

Scott Meyers, "CPU Caches and Why You Care", Mar. 2, 2011, pp. 1-23, https://www.aristeia.conn/TalkNotes/ACCU2011_CPUCaches.pdf (Year: 2011).*

Korean Office Action for Application No. 10-2016-0033036 dated Feb. 19, 2017.

Communication dated Aug. 29, 2017 from the Korean Intellectual Property Office in counterpart Patent Application No. 10-2016-0033036.

Chung, YoungJin et al., "The Early Write Back Scheme for Write-Back Cache", The Institute of Electronics Engineers of Korea, SD 46(11),pp. 101-109, 2009.11.

Communication dated Mar. 16, 2018, issued by the Korean Patent Office in counterpart Korean Application No. 10-2016-0033036.

* cited by examiner

CASE 1

CACHE

920

CASE 2

CACHE

DEVICE FOR MAINTAINING DATA CONSISTENCY BETWEEN HARDWARE ACCELERATOR AND HOST SYSTEM AND METHOD THEREOF

CROSS-REFERENCE TO RELATED APPLICATION

This application claims the priority benefit of Korean Patent Application No. 10-2016-0033036, filed on Mar. 18, 2016 in the Korean Intellectual Property Office, the disclosure of which is incorporated herein by reference.

BACKGROUND OF THE DISCLOSURE

Field of the Disclosure

The present disclosure relates to a device for maintaining consistency between a host system cache and a main memory in a general-purpose computing system equipped with a hardware accelerator for processing main memory data.

Description of the Related Art

A cache is a dedicated small high-speed memory device used to improve the performance of a computer, or a part of a main memory unit used for the same purpose.

A cache is installed between a high-speed central processing unit (CPU) and a main memory unit, which is slower than the CPU, and serves to provide a storage location for temporarily storing data and instructions, and thus, the cache allows the CPU to access the data or instructions at a speed several times faster (or a speed close to a CPU speed) than when the CPU reads the data or instructions directly from the main memory unit or writes the data or instructions directly to the main memory unit. In addition, when the capacity of a cache memory, cache size increases, a probability that requested data have been already stored in the cache is high, thereby improving performance accordingly.

In general, due to a write-back, i.e., a write-back policy, applied to most caches, a cache has the most recent valid data and old data that is not valid resides in a main memory.

In this case, when a hardware accelerator refers to the data of the main memory, the latest data of the cache is not reflected in the main memory, so that the main memory data that is not valid is referred to. That is, data inconsistency occurs between the cache and the memory. Conversely, even though the hardware accelerator updates the main memory data, a processor uses data residing in the cache and thus, cannot recognize the updated contents.

To solve a problem of data inconsistency, various solutions have been conventionally used.

For example, by not using a cache, a problem of data inconsistency can be solved. However, in this case, performance is degraded because the cache is not used.

As another example, even though a cache is used, a problem of data inconsistency can be overcome by flushing the cache before activating an accelerator. However, using this method may result in very slow processing speed and may cause bottlenecks in a system bus and a memory. Also, because the cache is flushed, performance may be severely degraded while the cache is being filled when processing other instructions after the accelerator is activated.

As another example, it is possible to circumvent a problem of data inconsistency by bypassing a cache, which can be done by setting a memory area used by an accelerator to a non-cacheable area. However, this approach may cause memory bottlenecks and performance degradation, because data required by the accelerator should be moved to the non-cacheable area before activating the accelerator. Nevertheless, this approach is considered the most common solution and is applied to most systems.

RELATED DOCUMENTS

Patent Documents

Korean Patent Application Publication No. 10-1999-0072593
Korean Patent Application Publication No. 10-2004-0038340

SUMMARY OF THE DISCLOSURE

Therefore, the present disclosure has been made in view of the above problems, and it is an object of the present disclosure to provide a device for maintaining data consistency between a hardware accelerator and a host system, and a method thereof.

In accordance with the present disclosure, the above and other objects can be accomplished by the provision of a device for maintaining data consistency between a hardware accelerator and a host system, wherein the device is at least temporarily implemented by a computer, and includes a determination unit responsible for determining whether an address which a hardware accelerator should access is present in a cache, and a control unit responsible for selectively performing write-back on data corresponding to the address when the address is present in the cache based on the determined result.

The processing unit according to one embodiment may process cache data in different processing modes based on the properties of the address.

The properties of the address according to one embodiment may correspond to at least one of reference, overwrite, temporary, and complex processes for the data.

In accordance with an aspect of the present disclosure, the above and other objects can be accomplished by the provision of a method of maintaining data consistency between a hardware accelerator and a host system, wherein the method is at least temporarily implemented by a computer, and includes a step of transferring arguments from a user program to a hardware accelerator API (Application Programming Interface), a step of calling at least one of write-back and invalidate functions in the hardware accelerator based on the properties of the arguments, a step of determining whether an address which the hardware accelerator should access is present in a cache and, when the address is present in the cache, a step of performing at least one of write-back and invalidation processes on the corresponding address in the cache according to at least one of the called write-back and invalidate functions and a step of controlling the hardware accelerator to be activated when at least one of the write-back and invalidation processes is completed.

The step of transferring arguments according to one embodiment may include a step of transferring the values of a constant variable and a pointer address, among arguments to be transferred to the hardware accelerator API.

The step of calling at least one of write-back and invalidate functions according to one embodiment may include a step of classifying the properties of the arguments into reference, overwrite, temporary and complex processes and calling at least one of the write-back and invalidate functions based on the properties of the arguments.

The step of performing at least one of write-back and invalidation processes according to one embodiment may include, for the reference process, a step of performing write-back of relevant data in the cache to a main memory and controlling the cache data to be maintained.

The step of performing at least one of write-back and invalidation processes according to one embodiment may include, for the overwrite process, a step of performing an invalidation process on the cache data.

The step of performing at least one of write-back and invalidation processes according to one embodiment may include, for the complex process, a step of performing write-back and invalidation processes based on reference and overwrite processes.

In accordance with another aspect of the present disclosure, there is provided a method of maintaining data consistency, wherein the method is at least temporarily implemented by a computer, and includes a step of determining whether an address which a hardware accelerator should access is present in a cache, and a step of selectively performing write-back on data corresponding to the address when the address is present in the cache based on the determined result.

The step of controlling according to one embodiment may include a step of controlling cache data to be processed in different processing modes based on the properties of the address.

The properties of the address according to one embodiment may correspond to at least one of reference, overwrite, temporary, and complex processes for the data.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Hereinafter, preferred embodiments of the present disclosure will be described in detail with reference to the accompanying drawings. However, the scope of the present disclosure is not limited by these embodiments. Like reference numerals in the drawings denote like elements.

Although terms used in the specification are selected from terms generally used in related technical fields, other terms may be used according to technical development and/or due to change, practices, priorities of technicians, etc. Therefore, it should not be understood that terms used below limit the technical spirit of the present disclosure, and it should be understood that the terms are exemplified to describe embodiments of the present disclosure.

Also, some of the terms used herein may be arbitrarily chosen by the present applicant. In this case, these terms are defined in detail below. Accordingly, the specific terms used herein should be understood based on the unique meanings thereof and the whole context of the present disclosure.

Before describing the present disclosure, cache-related terms used herein are described as follows.

Write-back: An action of reflecting the specific cache data in a main memory. After this action, the data may remain in the cache, or may be completely invalidated in the cache and exist only in the main memory.

Invalidation: A process by which data at the specific address of a cache is invalidated. That is, when a processor requests data at that address, it must access the data of a main memory, which may or may not be up to date.

Flush: A process of driving a specific address or all addresses present in a cache to a main memory. Cache data may or may not be maintained depending on a policy. In general, to expel cache data while maintaining consistency of the cache, a write-back process for updating the latest data in a main memory is performed first, and then the cache data is subjected to an invalidation process to secure a cache space.

Non-cacheable area: An address range that a processor accesses can be divided into cacheable addresses that use a cache and non-cacheable addresses that do not. When a processor accesses an address area specified as non-cacheable, the processor accesses the address directly without going through a cache. Thus, in this case, there is no problem associated with cache consistency. When caching causes problems in operating hardware such as peripheral input/output (I/O) equipment, the non-cacheable area is mainly used. Since the non-cacheable area does not use a cache, an access speed is very slow compared to a cacheable area.

Write-back cache (write-back policy cache): A cache that accesses a main memory only when requested data is fetched from the main memory or when cache data is updated to the main memory to secure a cache space. Since the number of accesses to a main memory is small, a system is fast, and most caches use a write-back policy. For reference, a policy that is contrary to the write-back policy is a write-through policy, which immediately updates changes in a cache to a main memory.

Figure 1:
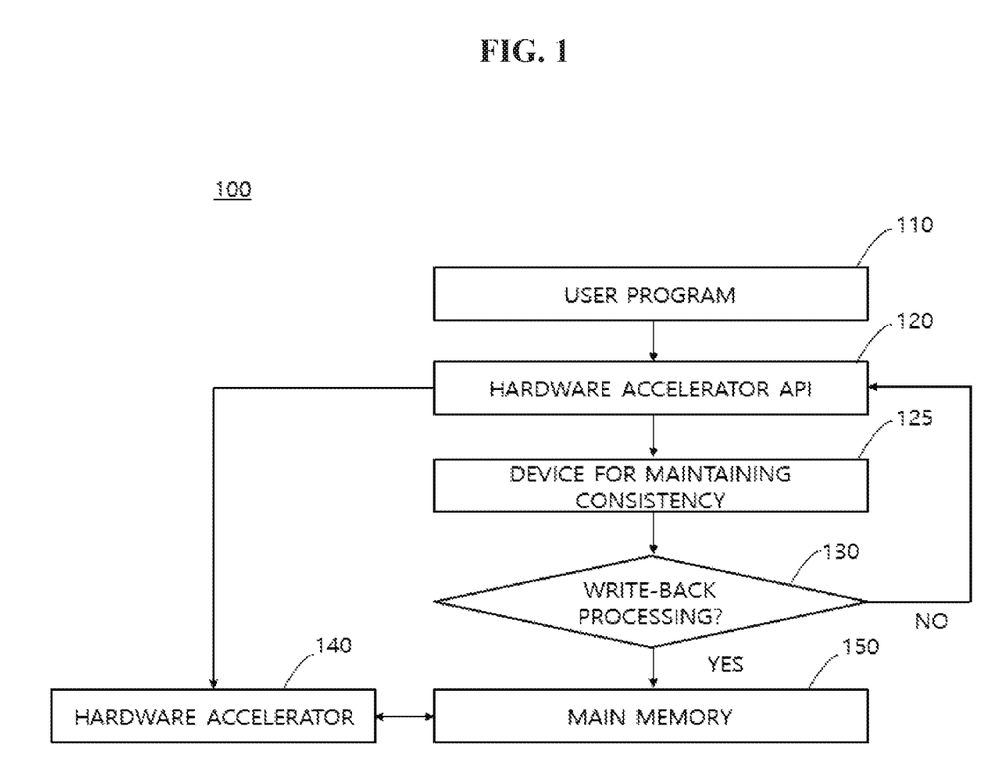
FIG. 1 is a diagram illustrating memory read/write during accelerator operation in a system to which a device of the present disclosure is applied.

FIG. 1 is a diagram illustrating memory read/write during accelerator operation in a system 100 to which a device of the present disclosure is applied.

A user program 110 calls a hardware accelerator API (Application Program Interface) 120 and transfers the values of a constant variable and a pointer address to the hardware accelerator API 120 as arguments to be transferred to the accelerator. At this point, the pointer address can be interpreted as address information required when using a pointer variable or an array.

The hardware accelerator API 120 grasps the properties of each argument for APIs maintaining consistency among APIs, and selectively calls a write-back cache or invalidation.

A consistency maintenance device 125 determines whether an address which a hardware accelerator should access is present in a cache. Based on the result, when the address is present in the cache, the consistency maintenance device 125 may be controlled to selectively perform write-back on data corresponding to the address, thereby maintaining data consistency between the hardware accelerator and a host system.

A write-through cache 130 may allow the addresses to be subjected to a write-back or invalidation process according to a received instruction. After the write-back action is completed, the hardware accelerator API 120 activates a hardware accelerator 140.

Meanwhile, since the latest data exists in a main memory 130, the hardware accelerator 140 may read and write the data of the main memory 130 without problems related to consistency.

As a result, the system 100 to which the device of the present disclosure is applied may solve problems related to consistency between the hardware accelerator and the host system without using a non-cacheable area.

In addition, when an address which the hardware accelerator 140 should access is present in a cache before activating the hardware accelerator 140, data corresponding to the address may be updated to a main memory by selectively performing write-back on the data, thereby maintaining consistency. In this case, the properties of the addresses to be accessed by the hardware accelerator 140 may be classified, and based on the properties, different write-back methods may be used to reduce a memory and a bus occupation rate required to maintain consistency. As a result, system resource consumption may be reduced, thereby reducing delay time.

Figure 2:
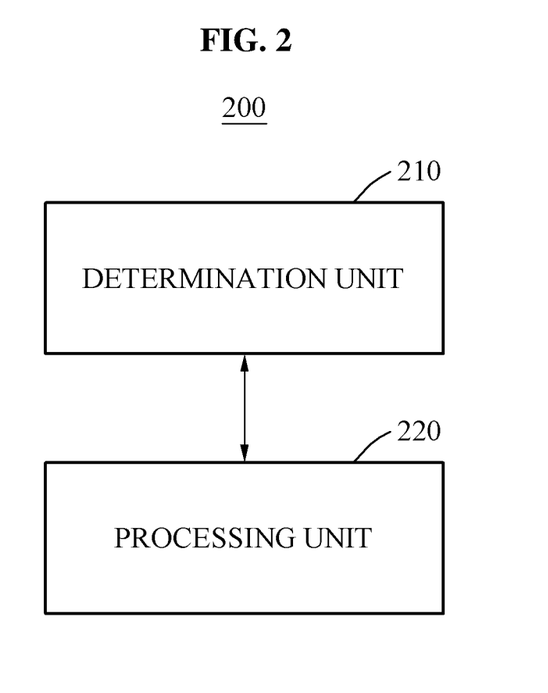
FIG. 2 is a diagram illustrating a device for maintaining data consistency between a hardware accelerator and a host system according to one embodiment.

FIG. 2 is a diagram illustrating a device 200 for maintaining data consistency between a hardware accelerator and a host system according to one embodiment.

The device 200 for maintaining data consistency according to one embodiment may include a determination unit 210 and a processing unit 220.

In addition, a method of operating the device 200 for maintaining data consistency according to one embodiment may include a step of determining whether an address which a hardware accelerator should access is present in a cache, and a step of selectively performing write-back on data corresponding to the address when the address is present in the cache based on the determined result.

The device 200 for maintaining data consistency may be implemented at least temporarily by a computing terminal. The computing terminal includes any type of electronic device such as a personal computer, a medical device, a smart phone, a tablet computer and a wearable device. The determination unit 210 and the processing unit 220 may be physical and/or logical elements included in such an electronic device, respectively. For example, the determination unit 210 and the processing unit 220 may be implemented by a general-purpose operation resource, which is controlled by dedicated hardware or software or an operating system. In addition, the determination unit 210 and the processing unit 220 may be implemented together on one chip, and thus may not be physically distinguished, and the implementation of such hardware resources may be changed as much as possible by the development of technology or design changes. Accordingly, it is understood that the functions, operations, and structures of the determination unit 210 and the processing unit 220 are distinguished from each other, but there may be cases where such division is interpreted differently according to an embodiment.

The determination unit 210 according to one embodiment may determine whether an address which a hardware accelerator should access is present in a cache.

Based on the result determined by the determination unit 210, when the address is present in the cache, the processing unit 220 according to one embodiment may selectively perform write-back on data corresponding to the address. For example, the processing unit 220 may maintain data consistency between the hardware accelerator and a host system by processing a write-back method differently based on the properties of the address.

In this case, the properties of the address may correspond to at least one of reference, overwrite, temporary, and complex processes for the data.

Depending on the properties of the address, the properties of pointers or array variables may be classified into four types: reference, overwrite, temporary, and complex.

First, reference is a process of referring to data in a hardware accelerator without overwriting existing values. Overwrite is a process of updating only new data in an accelerator without referring to existing values. Temporary is a process of using pointers or arrays to store intermediate results in an accelerator. Since host processors do not use the corresponding addresses during the temporary process, it does not matter if the values change during the process. Complex is a process in which features of the reference and overwrite processes are mixed.

A specific description of each process classified according to the properties of an address is described in detail with reference to FIGS. 4 and 7.

Figure 3:
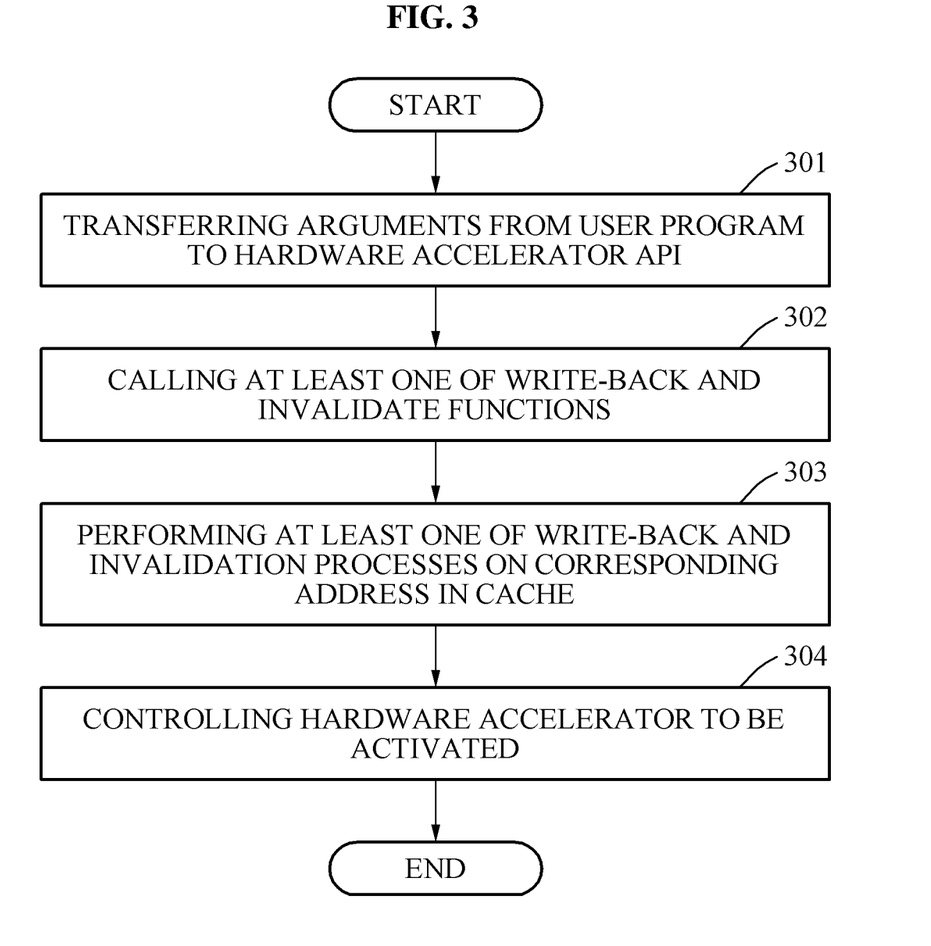
FIG. 3 is a diagram illustrating a method of maintaining data consistency between a hardware accelerator and a host system according to one embodiment.

FIG. 3 is a diagram illustrating a method of maintaining data consistency between a hardware accelerator and a host system according to one embodiment.

In the method of maintaining data consistency according to one embodiment, arguments are transferred from a user program to a hardware accelerator API (step 301). For example, according to the method of maintaining data consistency according to one embodiment, to transfer arguments, the values of a constant variable and a pointer address among arguments to be transferred to a hardware accelerator may be transferred to the hardware accelerator API.

Next, in the method of maintaining data consistency according to one embodiment, at least one of write-back and invalidate functions is called in the hardware accelerator based on the properties of the arguments (step 302). In addition, in the method of maintaining data consistency according to one embodiment, at least one of write-back and invalidation processes is performed on the corresponding address in a cache according to at least one of the called write-back and invalidate functions (step 303).

For example, in the method of maintaining data consistency, the properties of the arguments may be classified into reference, overwrite, temporary and complex processes, and based on this, at least one of the write-back and invalidate functions may be called.

In particular, in the method of maintaining data consistency, for the reference process, write-back of relevant data in a cache to a main memory may be performed and the cache data may be controlled to be maintained. In addition, for the overwrite process, an invalidation process may be performed on cache data.

In the method of maintaining data consistency, for the complex process, write-back and invalidation processes may be performed based on the reference and overwrite processes.

For example, in the case of the temporary process, an exceptional case may be considered where write-back and invalidate functions are not called.

In the method of maintaining data consistency according to one embodiment, when at least one of write-back and invalidation processes is completed, the hardware accelerator is controlled to be activated (step 304).

Figure 4:
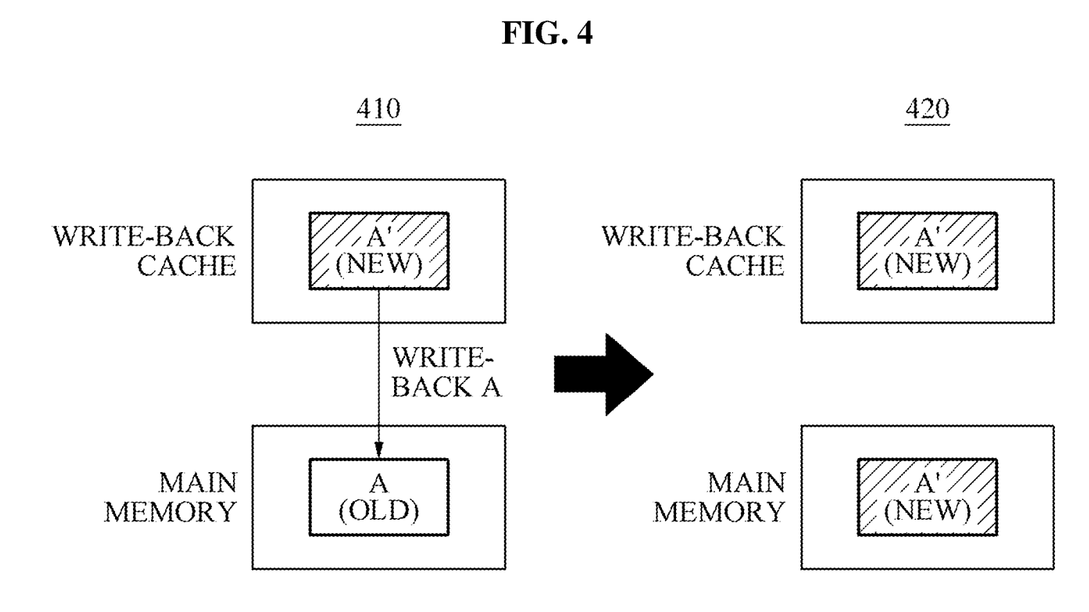
FIG. 4 is a diagram illustrating an embodiment related to a reference process among the properties of variables.

FIG. 4 is a diagram illustrating an embodiment related to a reference process among the properties of variables.

For the reference process, a hardware accelerator only refers to data values instead of performing a copy or overwrite process on the data values.

Drawing 410 shows that, when data inconsistency between a write-back cache and a main memory occurs, a hardware accelerator may refer to the latest data by performing write-back of data in the cache to the main memory and maintaining the cache data intact.

As a result, as shown in drawing 420, consistency between the write-back cache and the main memory may be maintained.

Figure 5:
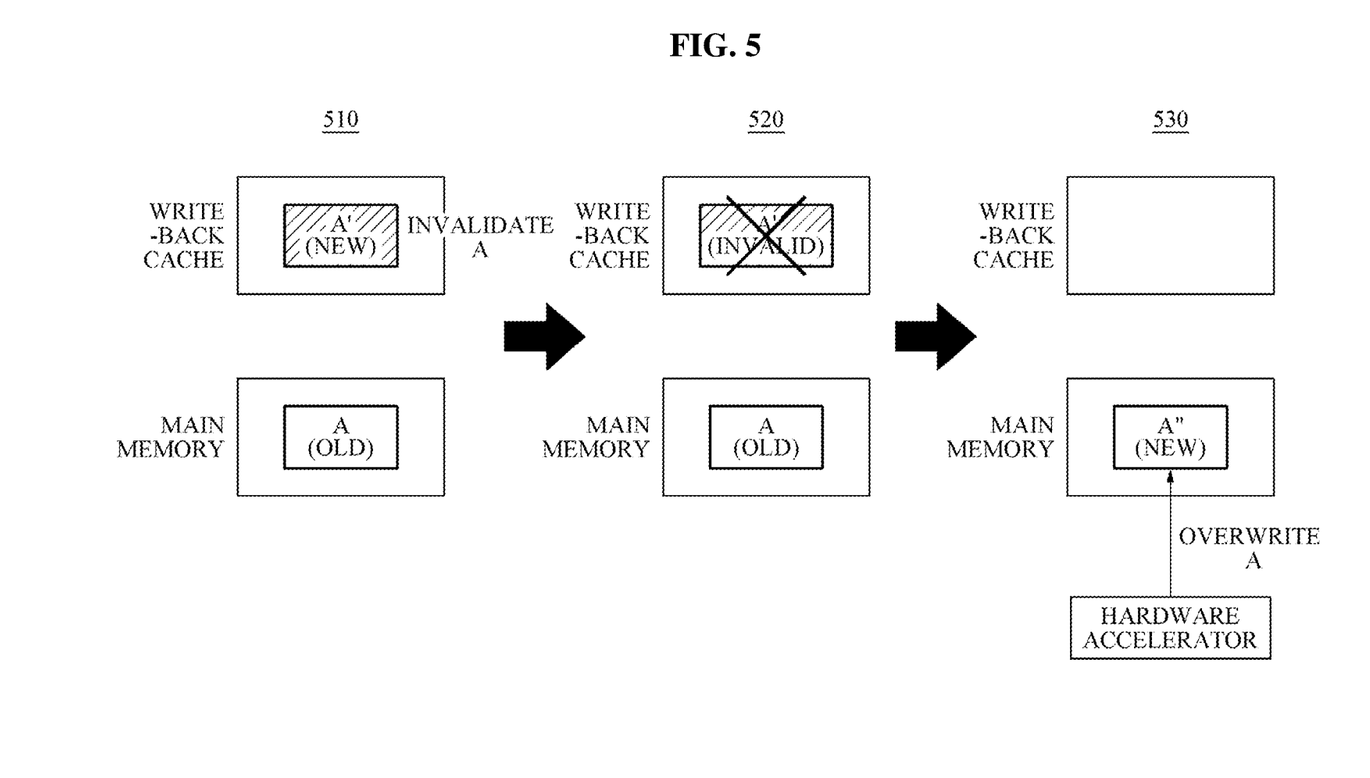
FIG. 5 is a diagram illustrating an embodiment related to an overwrite process among the properties of variables.

FIG. 5 is a diagram illustrating an embodiment related to an overwrite process among the properties of variables.

When data inconsistency between a write-back cache and a main memory occurs as shown in drawing 510, data in the write-back cache may be invalidated and old data in the main memory may be maintained intact as shown in drawing 520.

Thereafter, as shown in drawing 530, the data of the write-back cache may be removed after an invalidation process, and new data may be overwritten to the main memory from a hardware accelerator.

That is, the data in the main memory is updated by the hardware accelerator. In other words, since the hardware accelerator will record new data in the main memory, the data of the cache may be invalidated to maintain consistency.

For example, program code associated with reference and overwrite may be implemented as follows.

```
char SRC[4] = {1,2,3,4}, DST[4] = {5,6,7,8}; // declaring and initializing SRC and DST arrays
accelerator_memcpy(DST, SRC, 4); // a memcpy hardware accelerator API, copying a SRC array to a DST array
```

That is, when the data {1,2,3,4} of a SRC array is copied to a DST array, a hardware accelerator may overwrite the DST data by reading the SRC data. In this case, since the SRC and DST arrays are initialized in a declaration process, the data of the SRC and DST arrays is present in a cache before the hardware accelerator is activated. The SRC array may have the properties of 'reference', and the DST array may have the properties of 'overwrite'. Therefore, the data of the SRC array is updated to a memory and is maintained in a cache before the hardware accelerator API is activated. Additionally, the DST array is invalidated in a cache.

Figure 6:
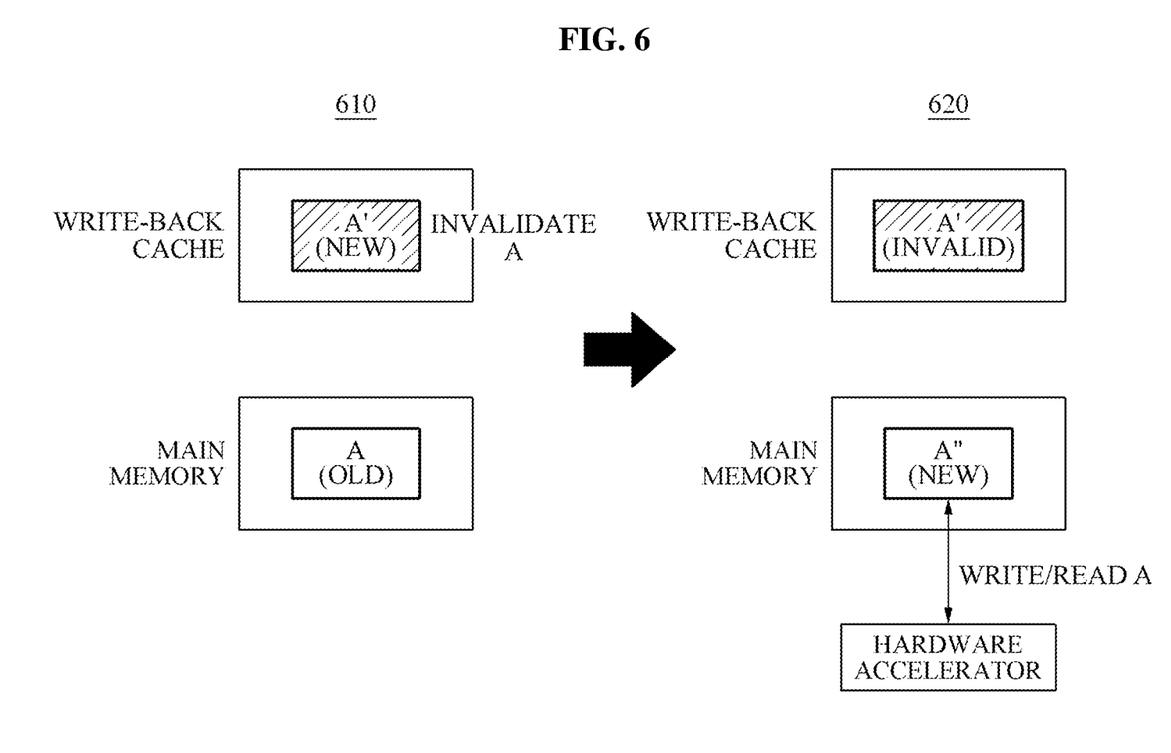
FIG. 6 is a diagram illustrating an embodiment related to a temporary process among the properties of variables.

FIG. 6 is a diagram illustrating an embodiment related to a temporary process among the properties of variables.

Drawing 610 illustrates a situation where data inconsistency between a write-back cache and a main memory occurs. In this case, a cache may be used as a temporary data space for arithmetic operations.

As shown in drawing 620, a cache space in which data A is invalidated may be used as the temporary data space. For example, when swap is performed on A and B, the swap may be implemented by allocating A to the temporary space, allocating B to the space of A, and allocating A recorded in the temporary space to the space of B again.

By applying the above, as shown in drawing 620, a hardware accelerator may record the latest data in the main memory by utilizing the space of the write-back cache as a temporary space. In this case, without requiring a host system to access corresponding addresses, the hardware accelerator may take full advantage of a main memory space to which corresponding data is allocated and the consistency of the corresponding data may be maintained.

Figure 7:
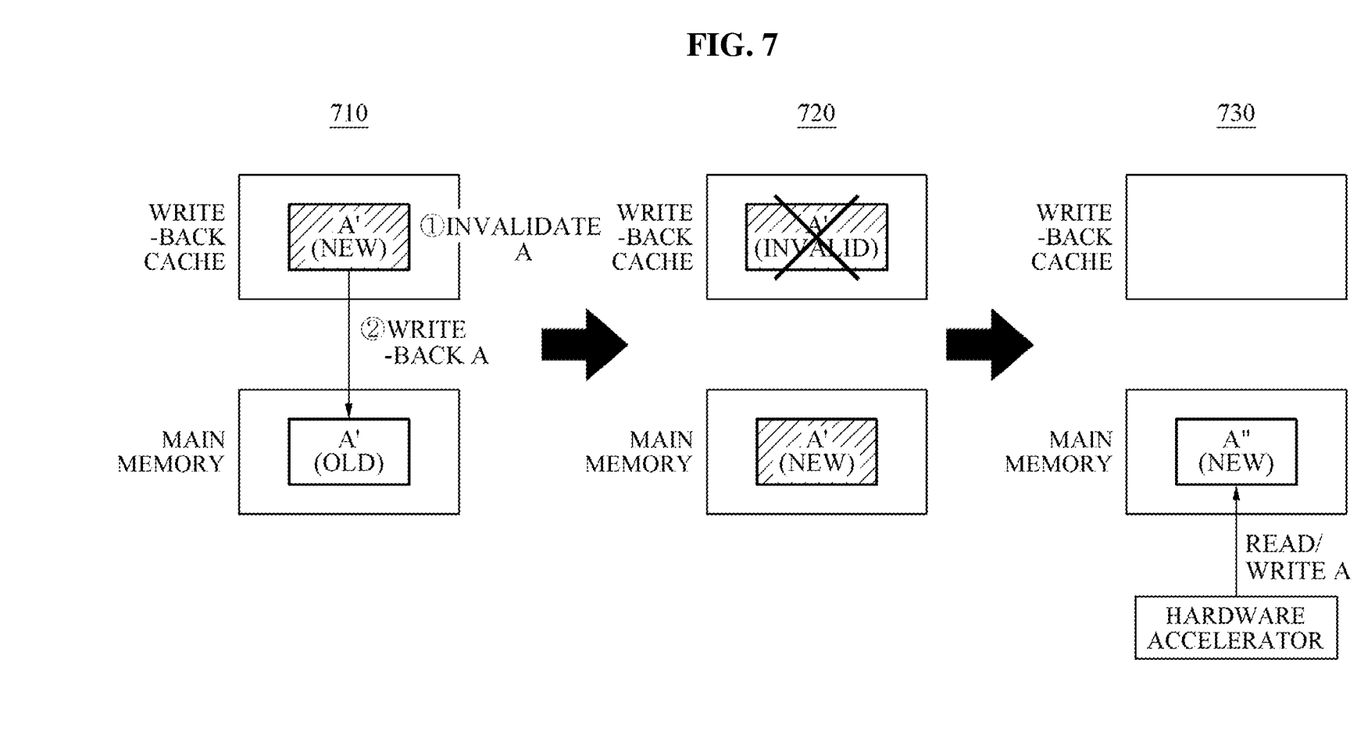
FIG. 7 is a diagram illustrating an embodiment related to a complex process among the properties of variables.

FIG. 7 is a diagram illustrating an embodiment related to a complex process among the properties of variables.

The complex process has both reference and overwrite properties. Drawing 710 illustrates a situation where data inconsistency between a write-back cache and a main memory occurs. In this case, after an invalidation process is performed on the data of the write-back cache, a write-back process may be performed. As shown in drawing 720, the data in the write-back cache may remain in an invalidated state, and the latest data may be recorded in the main memory.

That is, as shown in drawing 730, by transferring data from a hardware accelerator to the main memory, the latest data of the cache may be updated to the main memory, and thus no more data may remain in the cache, thereby maintaining consistency.

For example, program code associated with the temporary and complex processes may be implemented as follows.

```
float A[2][2] = {{2, 3},//declaring a 2 × 2 matrix {1, 4}};
float temp[2][2] = {0,0,0,0}; //declaring a 2 × 2 temporary matrix
accelerator_inverse(A, temp); // converting A array to an inverse matrix, temporarily using B array in the above process
```

That is, the hardware accelerator may create a new A array by referring to the value of A array. In this process, a space for temporary use is essential. When the hardware accelerator temporarily uses a main memory space, a temporary space such as a temporary array is indispensable. Therefore, the A array has the properties of 'complex', and the temporary array has the properties of 'temporary'.

Figure 8:
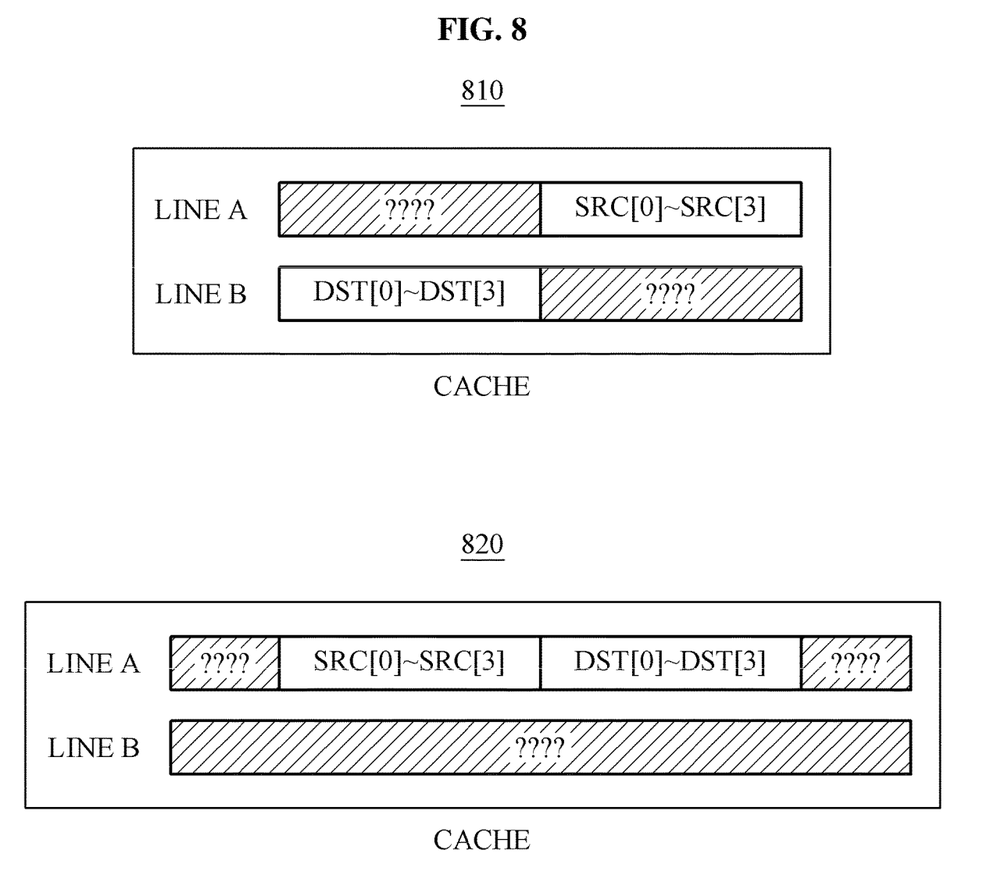
FIG. 8 is a diagram illustrating an embodiment of a problem occurring depending on cache line units using a device of the present disclosure.

FIG. 8 is a diagram illustrating an embodiment of a problem occurring depending on cache line units using a device of the present disclosure.

The cache line size of a general-purpose computing system is typically 64 bytes, and the write-back and invalidation processes of a cache line must be performed in a cache line unit. Thus, data associated with a hardware accelerator may reside in the same cache line as the unrelated data, as shown below.

```
char SRC[4] = {1,2,3,4}, DST[4] = {5,6,7,8}; // declaring and initializing SRC and DST arrays
accelerator_memcpy(DST, SRC, 4); // a memcpy hardware accelerator API, copying a SRC array to a DST array
```

In particular, as illustrated in drawing 810, in line A, data associated with the accelerator may be stored only in a portion corresponding to SRC[0] to SRC[3] in the entire line. In line B, the data associated with the accelerator may be stored only in a portion corresponding to DST[0] to DST[3].

Referring to drawing 820, in line A, the data associated with the accelerator may be stored only in portions corresponding to SRC[0] to SRC[3] and DST[0] to DST[3] in the entire space. In line B, the data associated with the accelerator may not be stored.

That is, inconsistency should be resolved by considering whether other data is present in the line.

Figure 9:
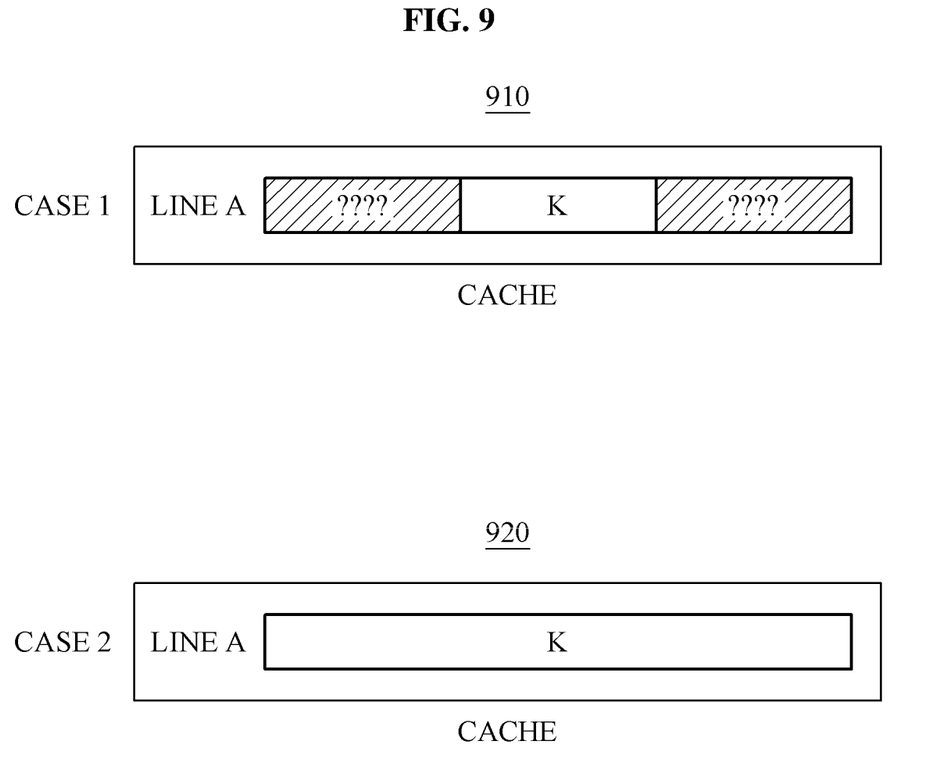
FIG. 9 is a diagram illustrating an embodiment for resolving inconsistency depending on whether other data other than K is present in line A.

FIG. 9 is a diagram illustrating an embodiment for resolving inconsistency depending on whether other data other than K is present in line A.

First, as illustrated in drawing 910, a situation where other data other than K is present in line A may be considered. This corresponds to the line A and line B of drawing 810 and the line A of drawing 820 in FIG. 8.

In particular, when the data of the overwrite properties is K, valid data other than K may exist in a cache, and thus a write-back process may be performed on line A to update the data to a main memory and an invalidation process may be performed on line A. As a result, data inconsistency between the cache and the main memory may be resolved.

Next, as illustrated in drawing 920, a case where other data other than K is not present in line A may be considered, and this case corresponds to line B of drawing 820 in FIG. 8.

In particular, the data of K may be large enough to occupy several lines, or the line offset of K is 0 and the size of K is a line size, so that K may occupy the entire line. In this case, when an invalidation process is performed on K, data inconsistency between the cache and the main memory may be resolved.

In addition, a reference process may be performed by performing write-back on the entire cache line including data. In this case, since the cache line is not subjected to an invalidation process, consistency is not affected even though write-back other than reference is performed on the data.

In the case of a temporary process, there is no need to consider consistency because a host processor does not refer to or overwrite corresponding data. Even though temporary data resides in the same cache line as other data, a hardware accelerator and a host process access different offset positions. Thus, this does not cause a problem.

In addition, in the case of a complex process, since the process has both reference and overwrite properties, reference and overwrite processes may be solved through a solution. That is, after performing a write-back process, an invalidation process may be performed to completely export from a cache.

Finally, when pointers or arrays to be used by an accelerator are not present in a cache, it is not necessary to call a consistency API.

As a result, according to the present disclosure, problems related to consistency between a hardware accelerator and a host system can be resolved without using a non-cacheable area. In addition, when an address which the hardware accelerator should access is present in a cache before the hardware accelerator is activated, data corresponding to the address is updated to a main memory by selectively performing write-back on the data, and thus consistency can be maintained.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

The methods according to the embodiments of the present disclosure may be implemented in the form of a program command that can be executed through various computer means and recorded in a computer-readable medium. The computer-readable medium can store program commands, data files, data structures or combinations thereof. The program commands recorded in the medium may be specially designed and configured for the present disclosure or be known to those skilled in the field of computer software. Examples of a computer-readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include machine language code created by a compiler and high-level language code executable by a computer using an interpreter and the like. The hardware devices described above may be configured to operate as one or more software modules to perform the operations of the embodiments, and vice versa.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

What is claimed is:

1. A device for maintaining data consistency between a hardware accelerator and a host system, wherein the device comprises:

a memory configured to store computer-readable instructions; and one or more processors configured to execute the computer-readable instructions such that the one or more processors are configured to:

transfer arguments from a user program to a hardware accelerator API (Application Programming Interface), call at least one of write-back function and invalidate function by classifying properties of the arguments into reference process, overwrite process, temporary process, and complex process as characteristics of the arguments, determine whether an address which the hardware accelerator should access is present in a cache, and selectively perform write-back process on data corresponding to the address by using the write-back function when the address is present in the cache based on the determined result, wherein an address range that a processor accesses is divided into non-cacheable addresses and cacheable addresses, and the one or more processors access only the cacheable addresses to execute the computer-readable instructions, wherein the one or more processors are further configured to perform the write-back process on the data in the cache to a main memory and control the data in the cache to be maintained in the reference process, where the one or more processors are further configured to perform invalidation process on the data in the cache, control data in the main memory to be maintained, remove the data in the cache and perform overwriting on the data in the main memory in the overwrite process, wherein the one of more processors further configured to perform the invalidation process on the data in the cache and then perform the write-back process on the data in the cache to the main memory in the complex process, wherein the write-back process and the invalidation process of the cache are performed in a cache line of the cache, wherein the one or more processors are further configured to:

perform the write-back process on the cache line to update data to the main memory and perform the invalidation process on the cache line based on the cache line containing both data associated with the hardware accelerator and data not associated with the hardware accelerator, and perform the invalidation process on the cache line based on the cache line containing only data associated with the hardware accelerator.

2. A method of maintaining data consistency between a hardware accelerator and a host system, wherein the method is at least temporarily implemented by a computer, and comprises:

transferring arguments from a user program to a hardware accelerator API (Application Programming Interface);

calling at least one of write-back and invalidate functions in the hardware accelerator based on properties of the arguments;

determining whether an address which the hardware accelerator should access is present in a cache; and when the address is present in the cache, performing at least one of write-back and invalidation processes on the corresponding address in the cache according to at least one of the called write-back and invalidate functions; and controlling the hardware accelerator to be activated when at least one of the write-back and invalidation processes is completed, wherein the calling comprises classifying properties of the arguments into reference process, overwrite process, temporary process and complex process and calling at least one of the write-back and invalidate functions based on the properties of the arguments, wherein an address range that a processor accesses is divided into non-cacheable addresses and cacheable addresses, and the method comprises accessing only the cacheable addresses to execute computer-readable instructions for performing the method, wherein the performing comprises performing the write-back process on data in the cache to a main memory and controlling the data in the cache to be maintained in the reference process, wherein the performing comprises performing the invalidation process on the data in the cache, controlling data in the main memory to be maintained, removing the data in the cache and performing overwriting on the data in the main memory in the overwrite process, wherein the performing comprises performing the invalidation process on the data in the cache and the performing the write-back process on the data in the cache to the main memory in the complex process, wherein the write-back process and the invalidation process of the cache are performed in a cache line of the cache, wherein the write-back process is performed on the cache line to update data to the main memory and the invalidation process is performed on the cache line based on the cache line containing data associated with the hardware accelerator and data not associated with the hardware accelerator, and wherein the invalidation process is performed on the cache line based on the cache line containing only data associated with the hardware accelerator.

3. The method according to claim 2, wherein the transferring comprises transferring values of a constant variable and a pointer address, among arguments to be transferred to the hardware accelerator, to the hardware accelerator API.

* * * * *